(No Model.) 2 Sheets—Sheet 1.
M. G. BYERS.
COMBINED STREET CLEANING BAG AND SHOVEL.
No. 440,618. Patented Nov. 18, 1890.
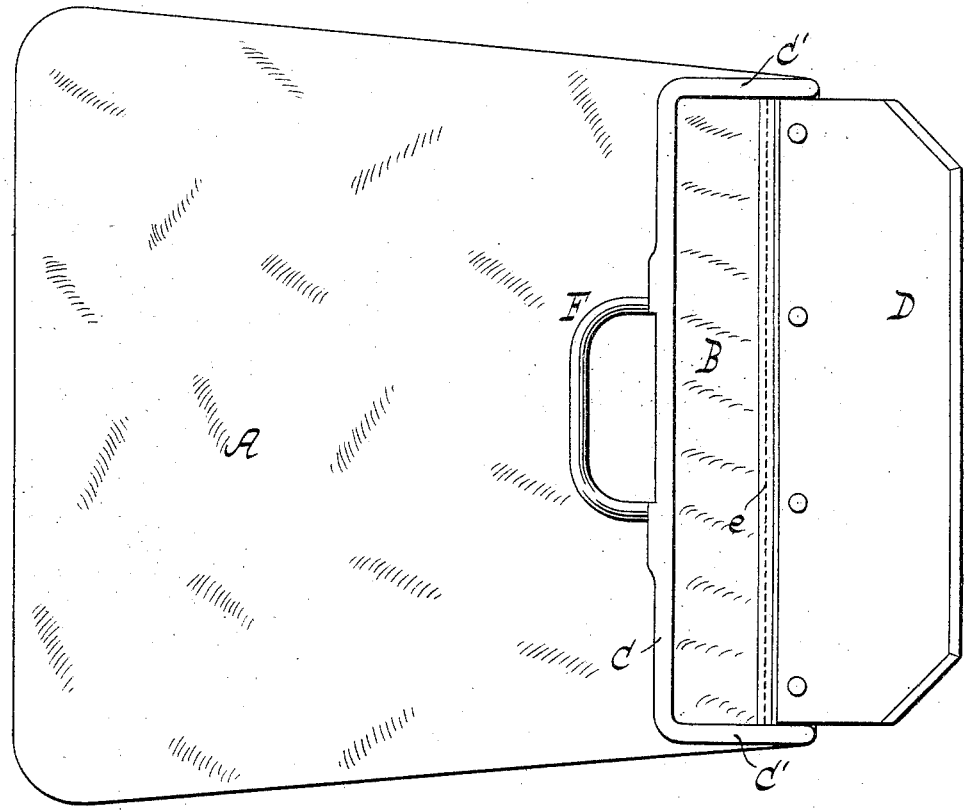
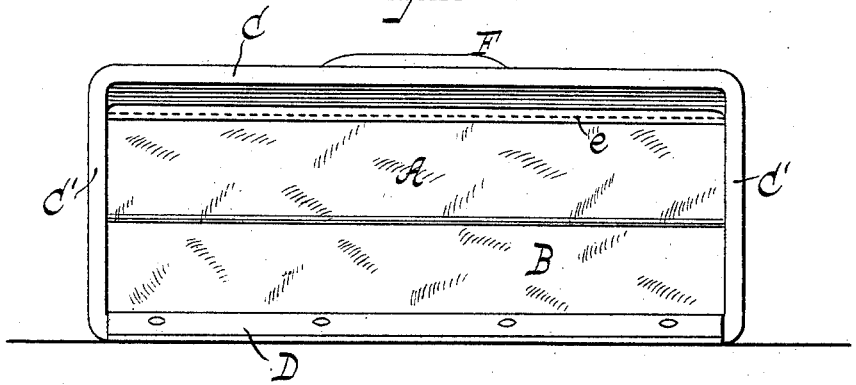
WITNESSES:
Chas. Wahlers
James S. Ewbank.
INVENTOR
Moses G. Byers
BY Francis C. Bowen
ATTORNEY (No Model.) 2 Sheets—Sheet 2.
M. G. BYERS.
COMBINED STREET CLEANING BAG AND SHOVEL.
No. 440,618. Patented Nov. 18, 1890.
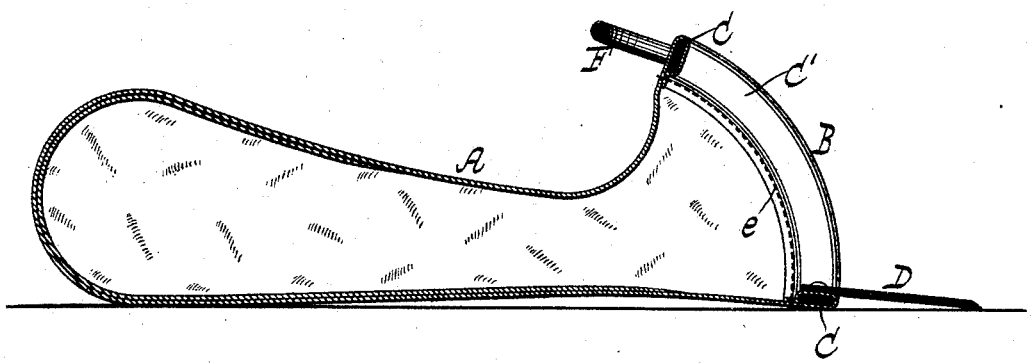
Fig. III.
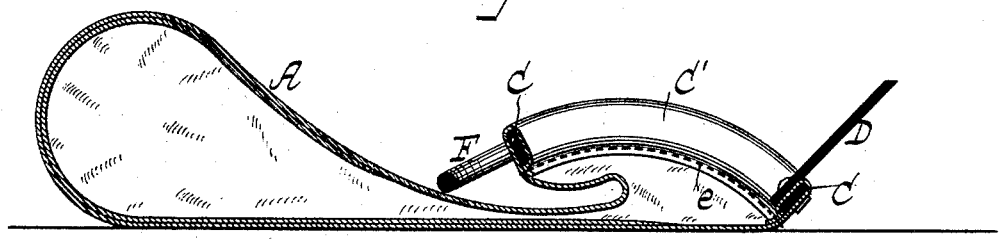
Fig. IV.
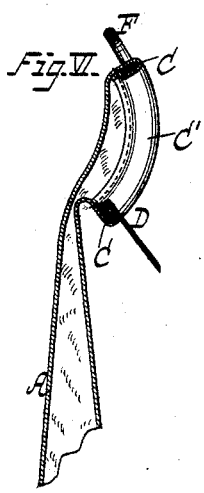
Fig. VI.
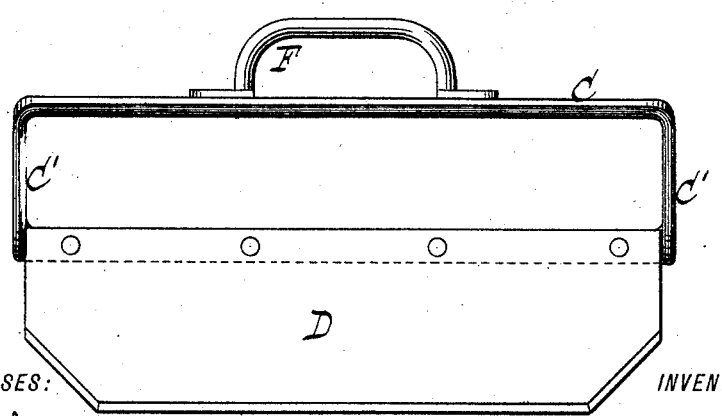
Fig. V.
WITNESSES:
Chas. Wahlers
Jas. S. Ewbank
INVENTOR
Moses G. Byers
BY Francis C. Bowen
ATTORNEY

UNITED STATES PATENT OFFICE.

MOSES G. BYERS, OF NEW YORK, N. Y.

COMBINED STREET-CLEANING BAG AND SHOVEL.

SPECIFICATION forming part of Letters Patent No. 440,618, dated November 18, 1890.

Application filed May 23, 1889. Renewed April 17, 1890. Serial No. 348,316. (No model.)

To all whom it may concern:

Be it known that I, MOSES G. BYERS, a citizen of the United States, and a resident of New York, in the county of New York and State of New York, have invented a certain new and useful Combined Street-Cleaning Bag and Shovel, of which the following is a specification.

The object of my invention is to obtain an article in which shall be combined a bag to be carried in the hand for receiving manure or other refuse matter, and a shovel or pan for permitting droppings of manure to be swept from the ground, as in a stall or upon the street, directly into the bag without the necessity, as heretofore, of first sweeping the manure into a separate shovel and then dumping it from the shovel into the bag. This object I have accomplished by applying to the mouth of a flexible bag a rigid frame, preferably of oblong shape, having one side provided with a blade forming a shovel or dustpan and the opposite side with a handle for manipulating both the bag and the shovel. Said bag-frame serves to keep the mouth of the bag open and in position to receive the manure that may be swept up on the shovel-blade when said blade is held in contact with the ground, and also to partially close said mouth when the bag is lifted from the ground by a tendency of the frame to take a position in the longitudinal plane of the bag.

In the accompanying drawings, Figure I represents a plan or top view of a combined bag and shovel embodying my invention as it appears when on the ground and in a position for use. Fig. II represents a front view thereof. Fig. III represents a longitudinal section thereof. Fig. IV represents a like section thereof as it appears when partially closed by the weight of the frame. Fig. V represents a top view of the frame and its attachments. Fig. VI represents a longitudinal section of a portion of the bag as it appears when lifted from the ground.

Similar letters of reference indicate corresponding parts.

The letter A indicates the body of the flexible bag, and B its mouth, to which latter is attached the rigid frame C. Said bag A is usually made of canvas and the frame C of metal, and for the purpose of securing the frame the canvas may be simply folded around the parts of the frame and stitched along the edges, as at e.

The letter D indicates the shovel-blade, and F the handle, each of which parts is firmly secured to one side of the frame C at a point opposite the other, as by means of rivets, said blade being usually made of sheet metal and the handle of a piece of bar metal bent to the proper shape. The shovel-blade D projects laterally from the frame C, and by grasping the handle F said blade may be brought in contact with the ground at the front edge, (where it may be beveled, as shown,) thereby permitting the manure or other matter to be readily swept thereon, as by a hand-broom, while the bag-frame C is at the same time brought to an upright position, thereby keeping the mouth B of the bag entirely open, as shown in Figs. I to III, inclusive, and since by the position of the shovel-blade it practically forms a part of said mouth, the manure may be at once received in the bag from the blade. When the bag-frame C is released by the hand, it tends to fall by gravity to a position approximately in the longitudinal plane of the bag A, as shown in Fig. IV, it assuming that position also when the bag is lifted off the ground by means of the handle F, as shown in Fig. VI, and since that portion of the bag at or near the mouth B is thereby contracted, it follows that said mouth is automatically closed by means of the frame—namely, to a sufficient extent to prevent the escape of the contents of the bag.

In the example shown the bag-frame C is of oblong shape, and when it is so made the two ends C' thereof are curved outwardly, as shown, the sides connected by said ends being straight, and by said curvature of the frame ends a comparatively large portion of the bag is presented at each side of the blade D, forming a wall to prevent escape of the manure from the blade in that direction.

In order to obviate wear of the bag by its contact with the ground, it may be doubled on its side or sides, as shown in Figs. III and IV.

What I claim as new, and desire to secure by Letters Patent, is—

1. The combination of a flexible bag and a rigid bag-frame having one side provided with a shovel blade and the opposite side with a handle, said frame being secured to the mouth of the bag and serving to automatically close said mouth when the frame is brought in the longitudinal plane of the bag, substantially as shown and described, for the purpose set forth.

2. The combination of a flexible bag, a rigid bag-frame of an oblong shape having outwardly-curved ends, a shovel-blade on one side of said frame, and a handle on the opposite side thereof, substantially as shown and described, for the purpose set forth.

MOSES G. BYERS.

Witnesses:
FRANCIS C. BOWEN,
JAMES S. EWBANK.